(12) United States Patent
Dolan

(10) Patent No.: US 8,542,107 B2
(45) Date of Patent: Sep. 24, 2013

(54) VAPOR ALARM IN FLOTATION FOB

(76) Inventor: Patrick Dolan, Seattle, WA (US)

( * ) Notice: Subject to any disclaimer, the term of this patent is extended or adjusted under 35 U.S.C. 154(b) by 575 days.

(21) Appl. No.: 12/822,965

(22) Filed: Jun. 24, 2010

(65) Prior Publication Data

US 2011/0156888 A1 Jun. 30, 2011

Related U.S. Application Data

(60) Provisional application No. 61/269,305, filed on Jun. 24, 2009.

(51) Int. Cl.
*B60Q 1/00* (2006.01)

(52) U.S. Cl.
USPC ........ 340/438; 340/439; 340/539.1; 340/632; 340/825.69; 114/211

(58) Field of Classification Search
USPC .................... 340/438, 426.11, 632, 628, 439, 340/517, 521, 522, 531, 539.1, 825.69; 114/211, 210; 440/1
See application file for complete search history.

(56) References Cited

U.S. PATENT DOCUMENTS

| | | | |
|---|---|---|---|
| 4,250,829 A * | 2/1981 | Stephens, Jr. | 440/1 |
| 4,806,911 A * | 2/1989 | Petri | 340/574 |
| 5,069,154 A * | 12/1991 | Carter | 114/211 |
| 7,083,408 B1 * | 8/2006 | Donnelly | 431/22 |
| 7,353,765 B1 * | 4/2008 | Feldman et al. | 114/211 |
| 7,990,275 B1 * | 8/2011 | Milanovich et al. | 340/626 |
| 2004/0066304 A1 * | 4/2004 | Keller | 340/691.8 |
| 2006/0274493 A1 * | 12/2006 | Richardson et al. | 361/683 |
| 2009/0289807 A1 * | 11/2009 | Enwright et al. | 340/691.4 |

* cited by examiner

*Primary Examiner* — Hung T. Nguyen
(74) *Attorney, Agent, or Firm* — FSP LLC

(57) ABSTRACT

An apparatus includes an alarm device, enclosed in a water tight container adapted to buoyantly support the alarm device and a wireless receiver, the water tight container adapted to couple with a key ring, including hardware logic and-or logic embodied in machine readable memory to receive information from a remote vapor sensor and to activate the alarm if the information indicates a hazardous vapor condition.

17 Claims, 7 Drawing Sheets

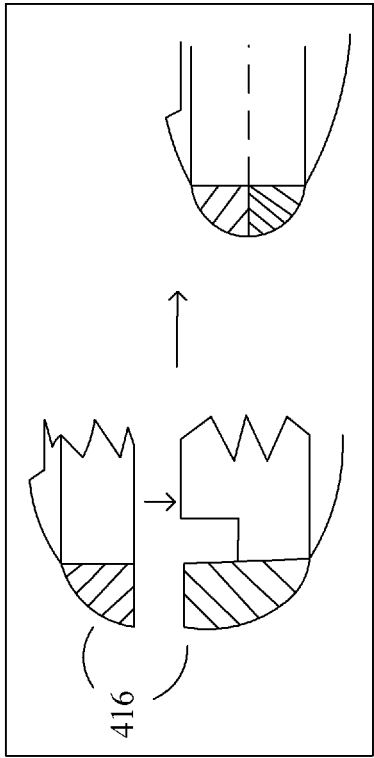
FIG. 4D
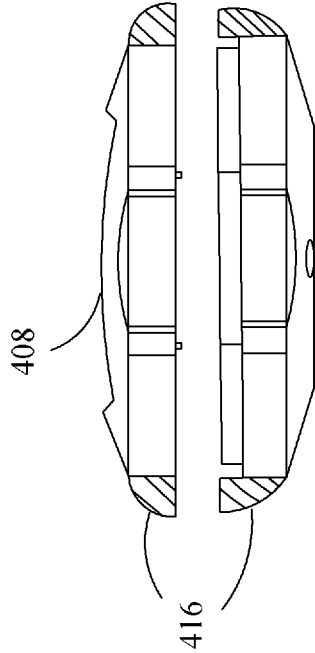
FIG. 4E
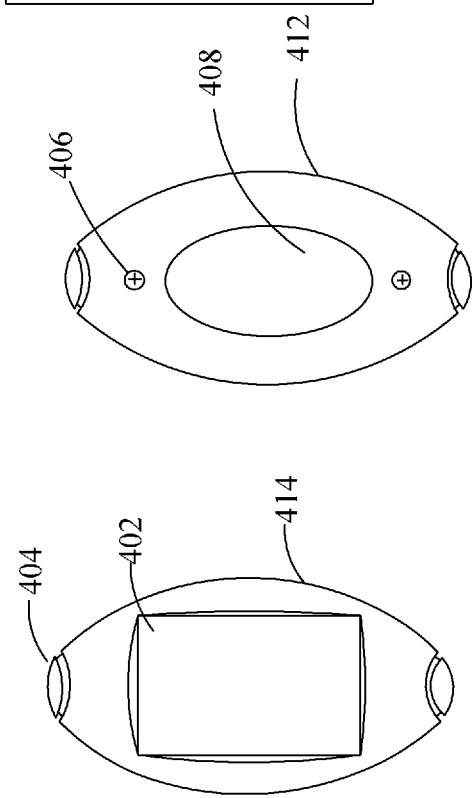
FIG. 4B
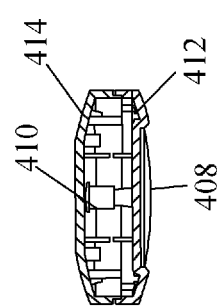
FIG. 4C
FIG. 4A

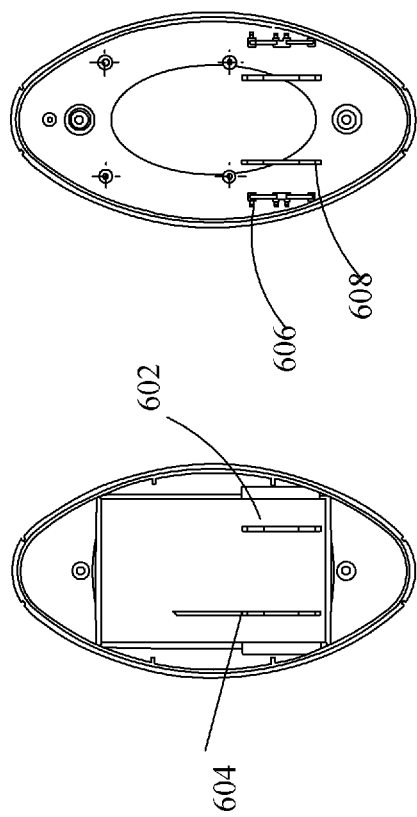

VAPOR ALARM IN FLOTATION FOB

PRIORITY CLAIM

This application claims priority under 35 U.S.C. 119 to U.S.A. provisional application No. 61/269,305 filed on Jun. 24, 2009, titled WIRELESS MARINE FUEL LEAK DETECTOR WITH KEYCHAIN FOB ENUNCIATOR, which is presently pending, and which is incorporated herein by reference in its entirety.

TECHNICAL FIELD

The present disclosure relates to vapor sensing systems.

BACKGROUND

The buildup of hazardous vapors, such as gasoline vapors, within the engine compartment of a vehicle can lead to fires, explosions, damage to property, and injury or loss of life. Systems are needed to alert to the dangers of hazardous vapor conditions.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

FIG. 4A-6D illustrate an embodiment of a watertight container for a vapor alarm.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to control and/or procedural signals, and/or settings and values, embodied in circuitry (e.g. memory or other electronic or optical circuits) that may be applied to influence the operation of a device. Magnetic media, electronic circuits, electrical and optical memory (both volatile and nonvolatile), and firmware are examples of physical structure that may embody logic. In general, logic may comprise combinations of software (embodied in machine readable media and/or memories), hardware circuits, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Vapor Hazard Alarm System

Figure 1:
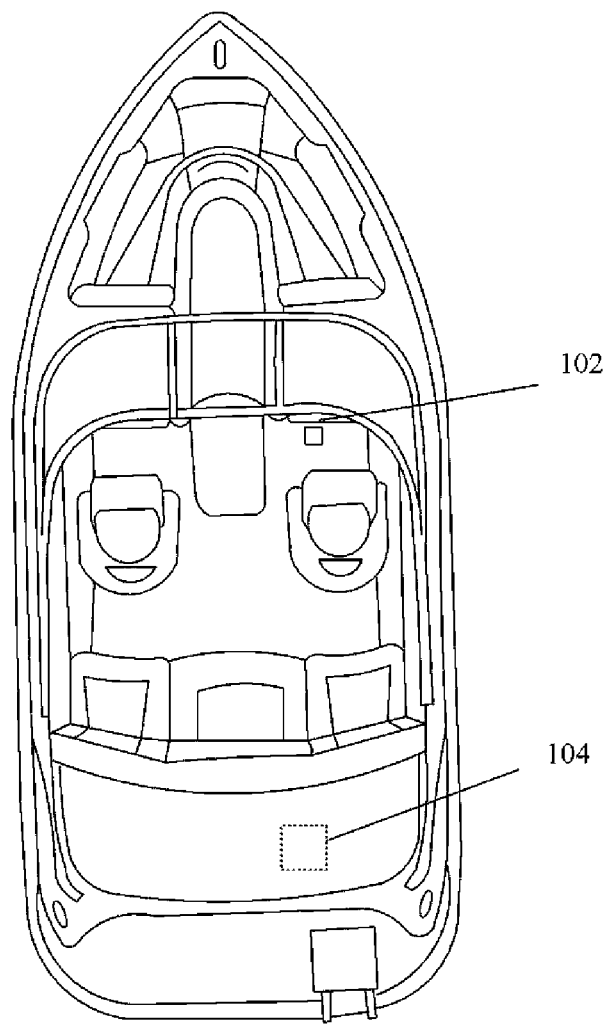
FIG. 1 illustrates a system in which a vapor sensor is mounted in an engine compartment 104 of a powered vehicle

FIG. 1 illustrates a system in which a vapor sensor is mounted in an engine compartment 104 of a powered vehicle; in this example, a boat. An alarm device is adapted to couple with a key ring and is coupled to the vehicle's ignition system at 102. The alarm device includes logic to communicate with the vapor sensor and to provide an alarm when a hazardous vapor condition exists in the engine compartment. The alarm device is watertight and buoyant. It typically has sufficient buoyancy to support itself and one or more attached keys.

Figure 2:
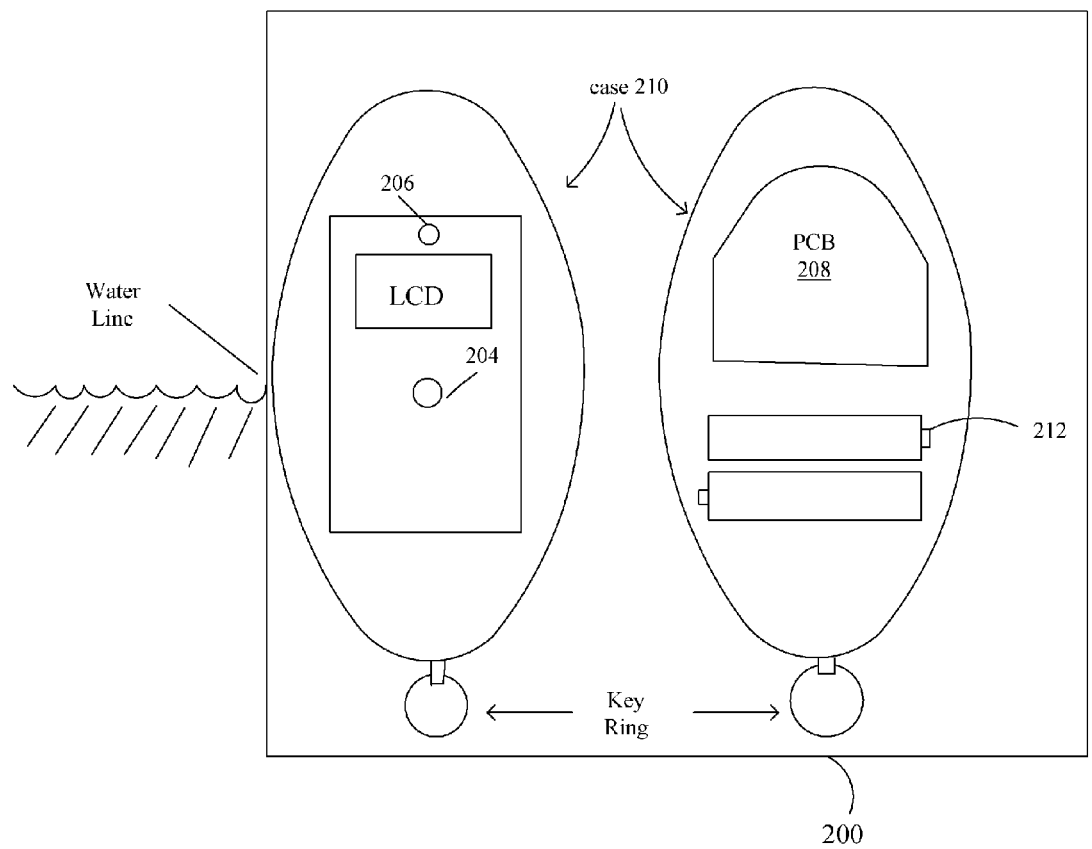
FIG. 2 illustrates more details of an alarm device.

FIG. 2 illustrates more details of an alarm device. The alarm device may include a display, such as a liquid crystal display (LCD) (example: NHD-C0216CZ-FSW-FBW-3V3 available from Newhaven Display), as well as one or more buttons 204 that may be used, for example, to acknowledge an alarm. Components of the alarm may be enclosed in a water tight case 210 shaped and weight distributed so that the container will float with the alarm and-or a display facing upward in the event the alarm device is dropped into the water. The alarm device further includes batteries 212, a printed circuit board 208 implementing a wireless transmitter and receiver (example: MRF24J40MA is a certified 2.4 GHz IEEE 802.15.4 radio transceiver module available from Microchip), and a waterproof audio-generating device 206 (example: Compact Waterproof Piezo Buzzer with Wide Operating Voltage Model Number: B103 Series available from Echo Electronics Co Ltd) at least partially exposed to an exterior of the water tight case 210. The water tight case 210 may have a substantially elliptical front profile.

The alarm device PCB 208 may implement certain safety-critical features. For example, the PCB 208 may include logic to communicate bi-directionally with a remote vapor sensor in the vehicle's engine compartment, and to provide an audible and-or visual alarm if wireless communication is lost with the remote vapor sensor. The alarm device PCB 208 may further include logic to provide an audible and-or visual alarm if battery power 212 becomes low (below a predetermined level that will vary according to the implementation) either in the vapor alarm, or in the remote vapor sensor located in the engine compartment. The alarm device PCB 208 may also include logic to provide an audible and-or visual indication if wireless communication is obtained with the remote vapor sensor after said communication was previously unavailable. The PCB 208 may include logic to disable an engine and-or starting of the vehicle's engine of the vehicle if a hazardous vapor condition is detected in the engine compartment. The PCB 208 may include logic to receive and visibly display status information about the remote vapor sensor, such as vapor conditions/levels in the vehicle's engine compartment.

In one embodiment the audio-generating device 206 is positioned on the water tight case 210 on an opposite end from where key(s) are attached (and also possibly opposite an end in which batteries 212 are located). This will result in most of the alarm device's weight distributed to the opposite side of the water tight case 210 from the audio-generating device 206. Logic comprising a wireless transmitter/receiver of the device may be collocated on the end with the audio-generating device 206. Therefore, the audio-generating device 206 and wireless transceiver may float above the water line and still be able to receive radio signals and provide audible warning of a dangerous engine compartment condition even while in the water.

Figure 3:
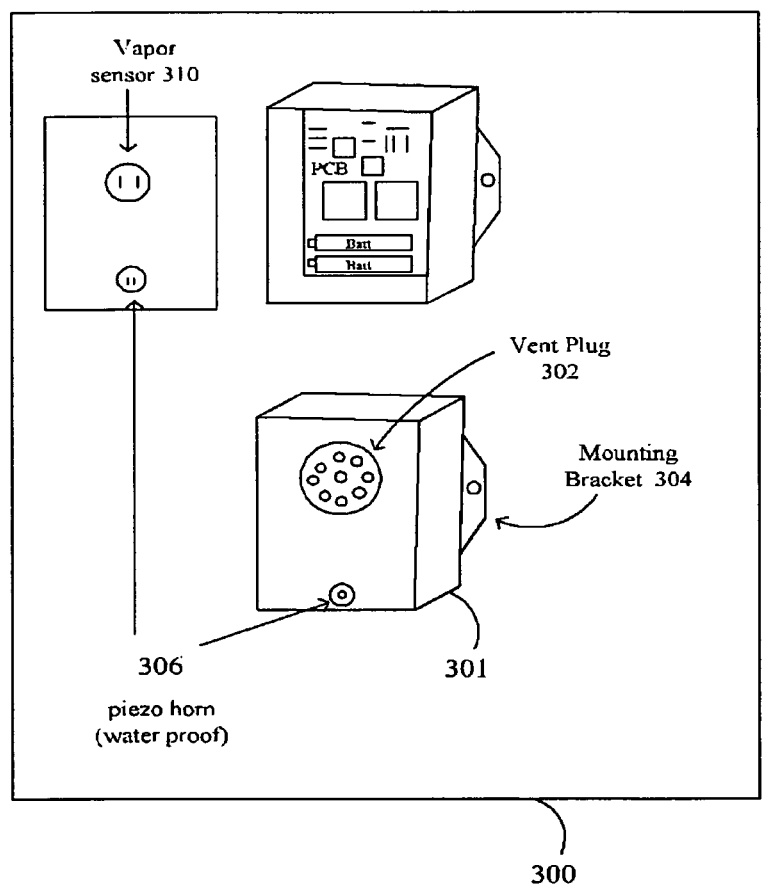
FIG. 3 illustrates an embodiment of a vapor sensor module for mounting in the engine compartment of a vehicle.
Figure 5B:
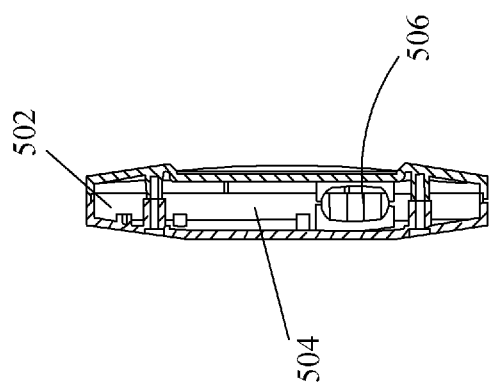
Figure 5A:
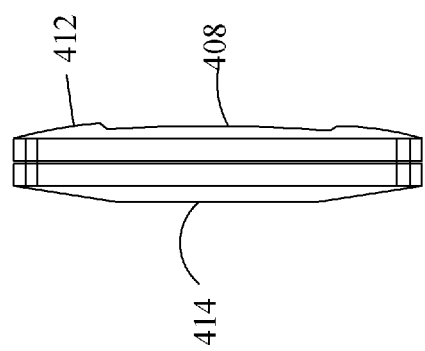

FIG. 3 illustrates an embodiment of a vapor sensor module for mounting in the engine compartment of a vehicle. The vapor sensor module comprises a vapor sensor 310 for detecting leak fuel vapors. A vent plug 302 permits the vapors to come into contact with the vapor sensor 310 inside the enclosure. The vapors sensor module comprises a PCB with a radio transmitter and receiver (transceiver) to communicate with a remote alarm device. The vapor sensor module further comprises an audio enunciator 306, which provides an audible alarm in the event of a hazardous engine compartment condition even when the remote alarm device is out of radio communication range. The vent plug/sensor assembly and audio enunciator are exposed to an exterior environment of the vapor sensor module but watertight from other areas of the vapor sensor module (e.g. the area comprising the transceiver and alarm logic). The vapor sensor module may be powered either by internal batteries (shown in drawing) or by the mains from the vehicle power supply (e.g. a 12V battery) with internal batteries supplying backup power in the event of main power failure. The vapor sensor module is typically mounted (e.g. via bracket 304) low in the engine compartment in order to quickly detect vapor conditions, as certain types of vapor (e.g. gasoline) tends to pool in the bottom of the engine compartment due to having a specific gravity that is heavier than air. The vapor sensor module is water resistant but not necessarily waterproof.

Various vapor sensing technologies may be employed. For example, the vapor sensor may comprise a catalytic sensor, a MOS sensor, an electro-chemical sensor, a chemical resistive sensor, an adsorptive sensor, a SAW sensor (surface acoustic wave sensor), and/or a micro balance vapor sensor.

FIG. 4A-6D illustrate an embodiment of a watertight container for a vapor alarm. Element 402 is a molded indent in the enclosure that forms a fiat surface to cut holes, mount buttons, etc. This feature may have a square hole for an LCD display, one or more round holes for control buttons, and another round hole for an audio enunciator. The holes may be waterproofed with a clear Lexan covering. Element 404 is for a holding bracket and may not be utilized in the keyfob application. Element 408 is a flat section that comprises the plastic enclosure and may stabilize the container on flat surfaces. Element 410 is an internal part of the screw hole 406.

A strip of foam rubber 416 or similar material may be glued to each half of the enclosure to provide additional buoyancy, and form a watertight seal by a compression of the foam rubber when the two halves are joined together. The weight of water displaced by the volume of the enclosure at a depth below the level of the enunciator, and the water weight displaced by the volume of the foam ring, may be selected to be more than the weight of the entire enclosure, foam, and components, plus several keys. Thus, if the enclosure falls into water, it will float with the enunciator and transceiver above the water line. (FIG. 2)

Element 502 is a screw mount hole for an internal PCB. Element 504 is an internal void to house a PCB. Element 506 is a molded battery holder, e.g. for two AAA batteries. Elements 602, 604, 606, and 608 are components of the battery holder 506. The metal contacts are held by 606. The battery bodies are secured by 604 and 608.

Figure 7:
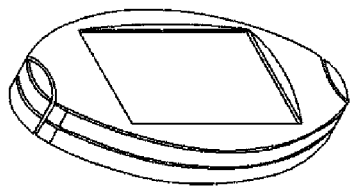
FIG. 7 illustrates an embodiment of an assembled, watertight, buoyant, keychain vapor alarm.

FIG. 7 illustrates an embodiment of an assembled, watertight, buoyant, keychain vapor alarm.

Implementations and Alternatives

There are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. An apparatus comprising:
an alarm device, enclosed in a water tight container adapted to buoyantly support the alarm device and a wireless receiver, the water tight container adapted to couple with a key ring, comprising hardware logic and-or logic embodied in machine readable memory to receive information from a remote vapor sensor and to activate the alarm if the information indicates a hazardous vapor condition.

2. The apparatus of claim 1, wherein the water tight container further comprises:
a substantially elliptical front profile.

3. The apparatus of claim 1, wherein the alarm device further comprises:
a waterproof audio-generating device at least partially exposed to an exterior of the water tight container.

4. The apparatus of claim 1, wherein the water tight container further comprises:
the container shaped and weight distributed so that the container will float with the alarm and vapor sensor receiver logic above a water line.

5. The apparatus of claim 1, further comprising:
hardware logic and-or logic embodied in machine readable memories to communicate bi-directionally with a remote vapor sensor, and to provide an audible and-or visual alarm if wireless communication is lost with the remote vapor sensor.

6. The apparatus of claim 1, further comprising:
hardware logic and-or logic embodied in machine readable memories to provide an audible and-or visual alarm if battery power in the vapor alarm becomes low either in the vapor alarm or in the remote vapor sensor.

7. The apparatus of claim 1, further comprising:
hardware logic and-or logic embodied in machine readable memories to provide an audible and-or visual alarm if wireless communication is obtained with the remote vapor sensor after said communication was unavailable.

8. The apparatus of claim 1, further comprising:
hardware logic and-or logic embodied in machine readable memories to disable an engine and-or starting of the engine of the vehicle if a hazardous vapor condition is detected in the engine compartment.

9. A system comprising:
a vapor sensor mounted in an engine compartment of a powered vehicle; an alarm device adapted to couple with a key ring, the alarm comprising hardware logic and-or logic embodied in machine readable memory devices to communicate with the vapor sensor and to provide an alarm when a hazardous vapor condition exists in the engine compartment.

10. The system of claim 9, wherein the alarm device further comprises:
a waterproof audio-generating device at least partially exposed to an exterior of the water tight container.

11. The system of claim 9, further comprising:
hardware logic and-or logic embodied in machine readable memories to communicate bi-directionally with a remote vapor sensor, and to provide an audible and-or visual alarm if wireless communication is lost with the remote vapor sensor.

12. The system of claim 9, further comprising:
hardware logic and-or logic embodied in machine readable memories to provide an audible and-or visual alarm if battery power in the vapor alarm becomes low either in the vapor alarm or in the remote vapor sensor.

13. The system of claim 9, further comprising:
hardware logic and-or logic embodied in machine readable memories to provide an audible and-or visual alarm if wireless communication is obtained with the remote vapor sensor after said communication was unavailable.

14. The system of claim 9, further comprising:
hardware logic and-or logic embodied in machine readable memories to disable an engine and-or starting of the engine of the vehicle if a hazardous vapor condition is detected in the engine compartment.

15. A key fob comprising:
a water tight container comprising an alarm device, the alarm device comprising hardware logic and-or logic embodied in machine readable memory to attempt to maintain constant radio contact with a vapor sensor in an engine compartment of a vehicle, and to activate the alarm if information received from the vapor sensor indicates a hazardous vapor condition in the engine compartment.

16. The key fob of claim 15, further comprising:
the container shaped and weight distributed so that the container will float with the alarm and radio contact logic above a water line.

17. The key fob claim 15, further comprising:
hardware logic and-or logic embodied in machine readable memories to provide an audible and-or visual alarm if battery power becomes low either in the key fob or in the remote vapor sensor.

\* \* \* \* \*